US007938881B2

(12) United States Patent
Blautzik et al.

(10) Patent No.: US 7,938,881 B2
(45) Date of Patent: May 10, 2011

(54) RECYCLING PROCESS FOR MOULDED CATALYST BODIES

(75) Inventors: Dieter Blautzik, Karlstein (DE); Hans-Joachim Alt, Bruchkoebel (DE); Peter Patzelt, Aschaffenburg (DE); Horst Meyer, Altenstadt (DE)

(73) Assignee: W.C. Heraeus GmbH, Hanau (DE)

( * ) Notice: Subject to any disclaimer, the term of this patent is extended or adjusted under 35 U.S.C. 154(b) by 0 days.

(21) Appl. No.: 12/466,710

(22) Filed: May 15, 2009

(65) Prior Publication Data

US 2009/0288518 A1 Nov. 26, 2009

(30) Foreign Application Priority Data

May 21, 2008 (DE) ........................ 10 2008 024 590

(51) Int. Cl.
*C22B 3/04* (2006.01)

(52) U.S. Cl. ........................................ 75/404; 75/744

(58) Field of Classification Search .................... 75/744, 75/404
See application file for complete search history.

(56) References Cited

U.S. PATENT DOCUMENTS 5,169,525 A * 12/1992 Gerteis ........................ 210/232
6,156,326 A 12/2000 Schneider et al.
7,709,135 B2 * 5/2010 Shore et al. .................. 429/483

* cited by examiner

*Primary Examiner* — George Wyszomierski
*Assistant Examiner* — Tima M McGuthry-Banks
(74) *Attorney, Agent, or Firm* — Norris McLaughlin & Marcus, P.A.

(57) ABSTRACT

Process for removing the noble metal from noble metal-containing moulded catalyst bodies, comprising these steps of A leaching the noble metal from loosely heaped moulded catalyst bodies,
B removing the mother liquor,
C automated conveying of the moulded bodies into a centrifuge,
D renewed leaching,
E separating off of the residual mother liquor by centrifuging.

Figure 1:
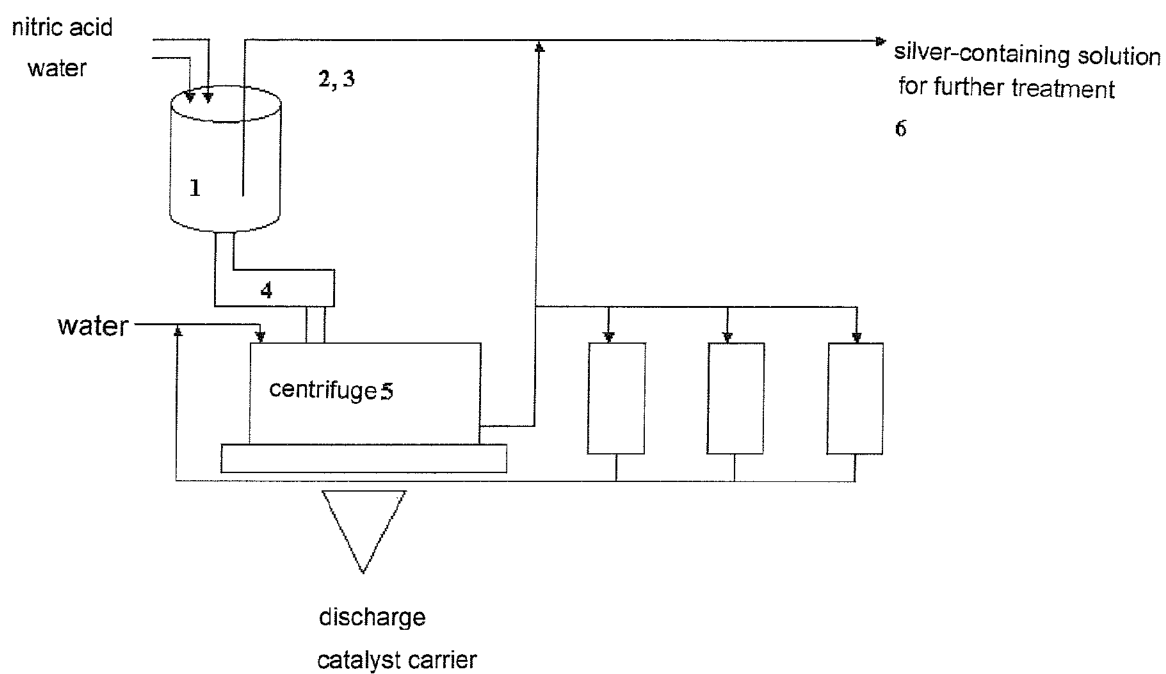

7 Claims, 1 Drawing Sheet nitric acid
water
2, 3
silver-containing solution for further treatment
6
1
4
water
centrifuge 5
discharge
catalyst carrier

RECYCLING PROCESS FOR MOULDED CATALYST BODIES

The invention relates to a process for removing the noble metal, in particular silver, from noble metal-containing, in particular silver-containing, moulded catalyst bodies.

STATE OF THE ART

It is difficult to remove the noble metals, e.g. silver, completely from spent catalyst carrier material. In U.S. Pat. No. 6,156,329, a novel use of catalyst carriers containing residual silver as anti-microbially effective material for water treatment or for coatings is therefore proposed in order to make use of the necessarily arising residual silver content.

OBJECT

However, when no in-house use is provided for carrier materials still containing silver, as in U.S. Pat. No. 6,156,329, and, instead, the material is to be coated, as part of recycling processes, renewed as catalyst or recycled for other purposes, the task arises to transfer as much silver as possible into the extract in order to obtain a largely silver-free carrier material. This is possible, for example, if the material is comminuted such that the effect of leaching is enhanced. However, comminution requires energy and mechanical effort. In addition, care would have to be taken to ensure that the leached material is moulded into carriers before being coated anew.

THE INVENTION

In contrast, a process has been developed in the case of which, surprisingly enough, it is possible to omit comminution entirely. According to the invention, the noble metal-containing moulded bodies, e.g. pellets or cylinder rings, are passed, following initial leaching, as a whole by screw conveying or a vibration channel to a washing centrifuge where the noble metal extraction process is continued and the carrier material largely freed from liquid. The quantity of extracted noble metal is increased in this way and the carrier contains only very little noble metal.

Alternatively, it is also possible to convey, following initial leaching with nitric acid, the carrier material together with the mother liquor directly to the centrifuge and to carry out the further leaching and liquid separation process entirely on the centrifuge.

Consequently, the invention relates to a process for removing the noble metal, in particular silver, from noble metal-containing, in particular silver-containing, moulded catalyst bodies with these steps of A leaching the noble metal from loosely heaped moulded catalyst bodies, B removing the mother liquor, C automated conveying of the moulded bodies into a centrifuge, D renewed leaching in the centrifuge, E separating off of the residual mother liquor by centrifuging.

Leaching in step A and D takes place with nitric acid in the case of silver.

Step B may consist e.g. of allowing to drain off, pumping off or sucking off.

Step C is appropriately carried out by screw conveying or vibration conveying.

The centrifuge used for steps C to E should satisfy one or several of the following requirements:

1. During filling of the centrifuge, it should be possible to achieve a largely homogenous distribution of the moulded catalyst bodies across the drum diameter and across the drum height because otherwise a) the centrifuge operates out of balance and b) because washing out of the bulked solids cannot take place uniformly thus preventing complete removal of the noble metal-containing solution by washing. Numerous centrifuge arrangements known to the expert using conventional methods of filling, e.g. a simple filling tube, are therefore excluded.

2. The centrifuge should operate discontinuously since, otherwise, an insufficient residence time is available for the wash process in the machine (the wash process is diffusion controlled). All fully continuous centrifuges, e.g. decanting centrifuges, separators and push-type centrifuges, are therefore excluded. The process thus takes place appropriately in such a way that steps D and E are carried out batchwise, i.e. discontinuously.

3. Even if the solid/liquid separation process including washing out itself is basically carried out discontinuously, the centrifuge should be such that an automated quasi-continuous discharge of the washed out material is ensured. This is particularly difficult in this specific case because the material projected against the drum wall in the machine with high C values is usually very hard and abrasive (e.g. $Al_2O_3$ or $Al_2O_3$/$ZrO_2$ carrier materials). The tried and tested method of discharge via skimmer tubes or skimmer knifes is therefore unsuitable for such carrier materials. All peeling centrifuges are therefore excluded as are all centrifuges to be emptied manually.

As a result of the sum total of the requirements listed above, practically all centrifuges available on the market have proved unsuitable for the task according to the invention insofar as leaching of silver from moulded $Al_2O_3$ bodies is involved.

Consequently, the invention relates in particular to the use of suitable centrifuges of the pull action filter centrifuge and inverted filter centrifuge type in connection with the above-mentioned process. The centrifuges involved are the usual ones such as e.g. those from Ferrum, type DZF 1000/1250.

The moulded bodies are preferably small cylindrical tubes of aluminium oxide. It goes without saying that the process can be adapted to suit other spent moulded catalyst bodies which are optionally coated with other materials. This is, for example, possible by selecting the solvent, the leaching time and the temperature.

FIGURES

FIG. 1 shows the process details of an exemplary embodiment of the process.

EXAMPLE

In the case of the embodiment of the process shown in FIG. 1, spent loosely heaped catalyst is first of all leached in a container 1 with a mixture of concentrated nitric acid and water (corresponds to step A). The silver nitrate solution formed and a first quantity of washing water 2, 3 are drawn off (step B). They are later on passed to silver chloride precipitation 6 or another further treatment.

Part of the moulded catalyst bodies thus treated is passed via a screw conveyer or a vibration channel 4 to the centrifuge 5 (step C). There, leaching with water with partial recycling of the liquor (step D) and centrifuging (step E) are carried out. The moulded catalyst bodies are automatically removed from the centrifuge after this second leaching operation. The combined extracts are passed to silver chloride precipitation 6 or another further treatment.

The invention claimed is:

1. Process for removing the noble metal from noble metal-containing moulded catalyst bodies comprising the steps of (a) leaching the noble metal from loosely heaped moulded catalyst bodies, (b) removing a mother liquor, (c) automatically conveying of the moulded bodies into a centrifuge, (d) renewed leaching, (e) separating off of the residual mother liquor by centrifuging.

2. Process according to claim 1, wherein the noble metal is silver and the moulded catalyst bodies are silver-containing.

3. Process according to claim 2, wherein nitric acid is used for leaching.

4. Process according to claim 1 wherein step B comprises draining, pumping off or sucking off.

5. Process according to claim 1 wherein, step C is carried out by screw conveying or vibration channel.

6. Process according to claim 1 wherein, steps D and E and optionally B are carried out in a pull action filter or inverted filter centrifuge.

7. Process according to claim 1 wherein, steps D and E take place discontinuously.

* * * * *